May 21, 1940.  H. O. HEM  2,201,368
WEIGHING SCALE
Filed April 13, 1938  2 Sheets-Sheet 1
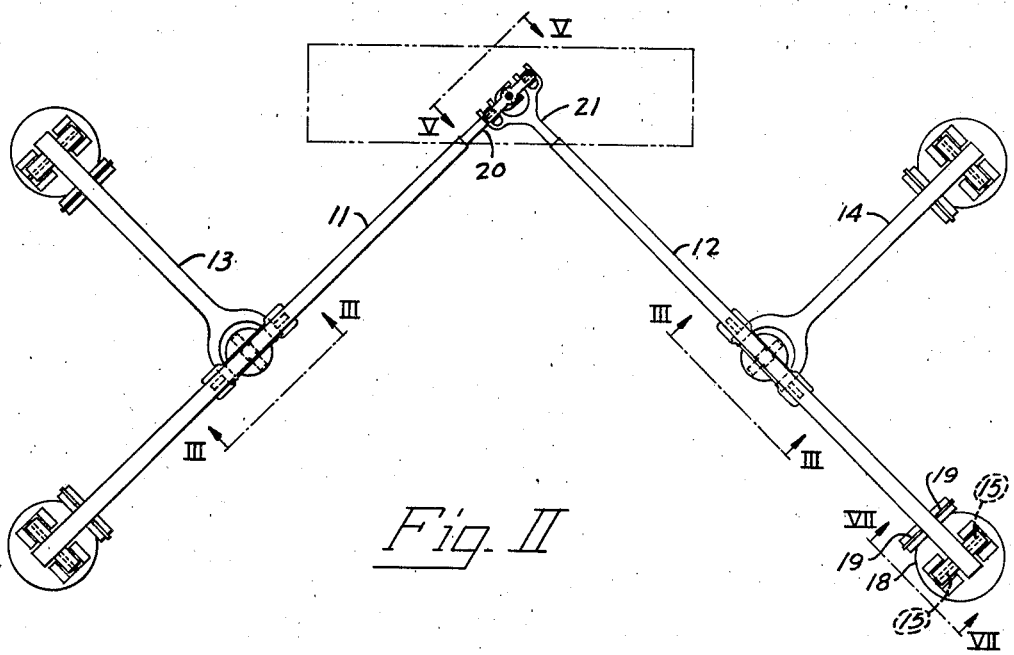
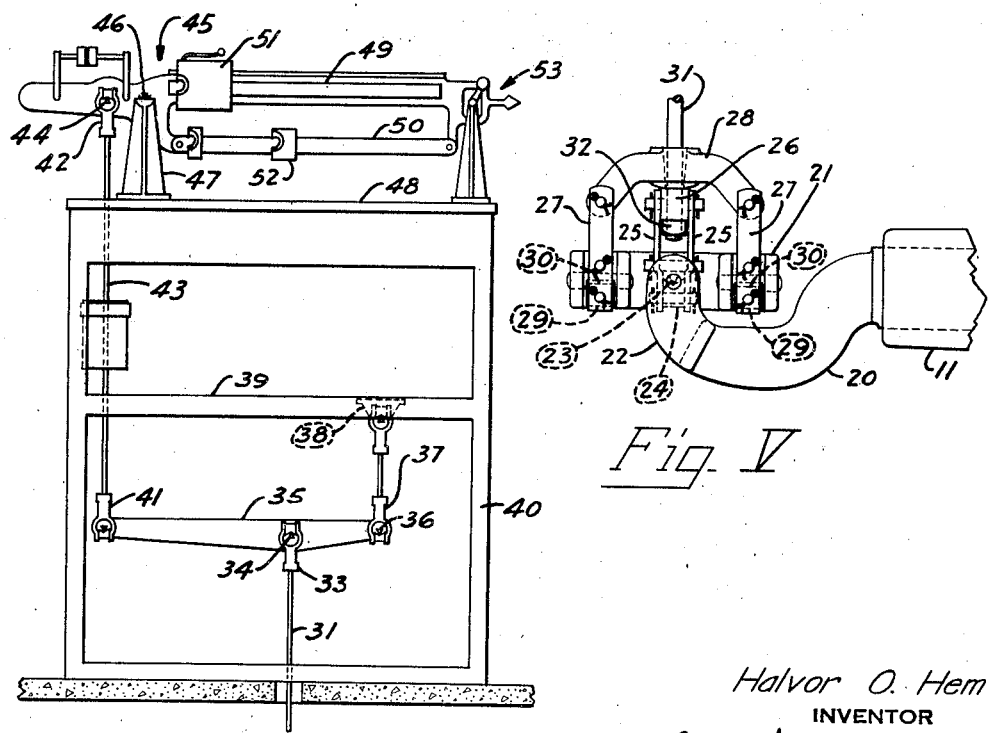
Halvor O. Hem
INVENTOR
BY Marshall & Marshall
ATTORNEYS May 21, 1940.　　　　　H. O. HEM　　　　　2,201,368
WEIGHING SCALE
Filed April 13, 1938　　　2 Sheets-Sheet 2
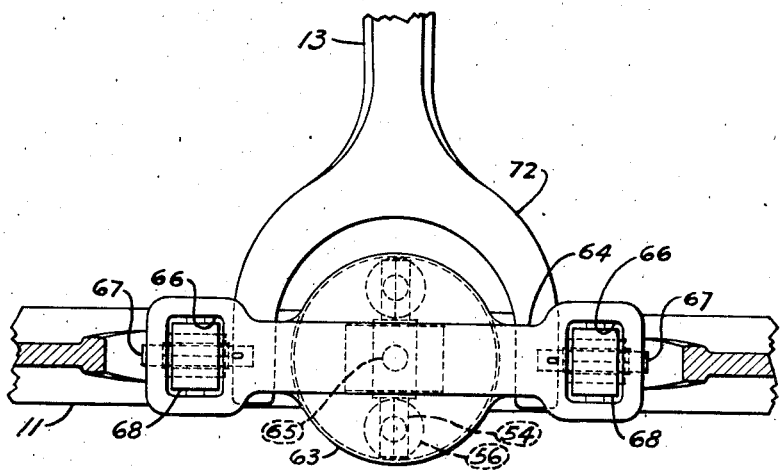
Fig. IV
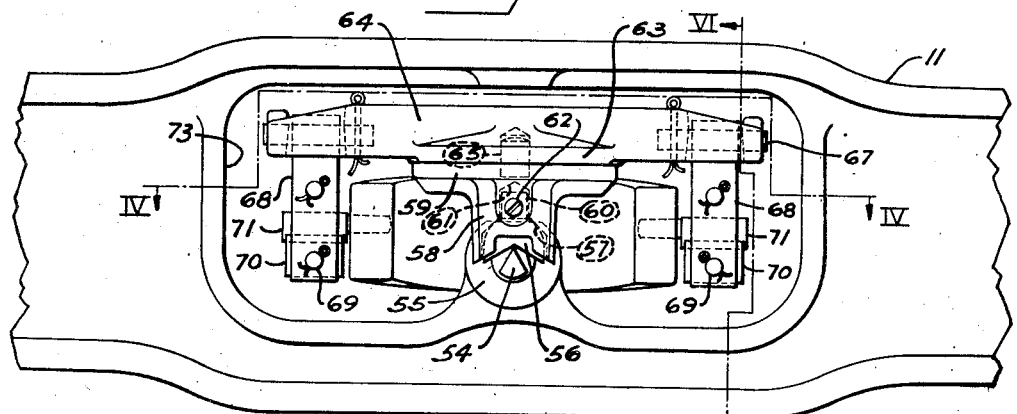
Fig. III
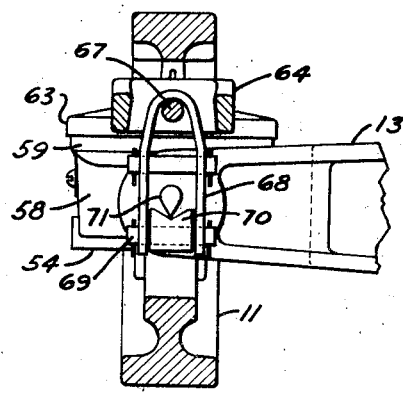
Fig. VI
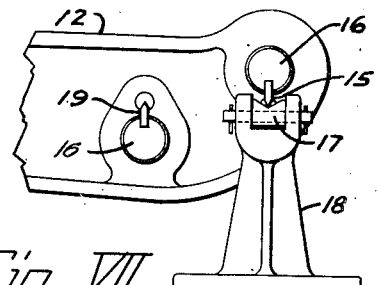
Fig. VII
Halvor O. Hem
INVENTOR
BY Marshall & Marshall
ATTORNEYS Patented May 21, 1940

2,201,368

UNITED STATES PATENT OFFICE 2,201,368

WEIGHING SCALE

Halvor O. Hem, Toledo, Ohio, assignor to Toledo Scale Manufacturing Company, Toledo, Ohio, a corporation of New Jersey Application April 13, 1938, Serial No. 201,773

4 Claims. (Cl. 265—71)

This invention relates to weighing scales, particularly to platform scales of the heavy capacity type such as are employed for weighing motor trucks, or other heavy loads. The platform lever mechanism for such scales is usually mounted in a concrete pit and at times the location of the scale is such that the pit must be quite shallow. This requires that all the levers be mounted in one horizontal plane and necessarily the connections between the pivots of the several levers are quite short and any settling of one of the supports on which the levers are fulcrumed is liable to cause serious errors in the scale indication due to so-called "out of plumb" and "out of line" conditions which cause binding, and unbalanced force components. Such errors are greatly aggravated when the connections between the levers are short.

The principal object of this invention is therefore the provision of improved means for pivotally connecting the platform levers of a scale.

Another object is the provision of a platform lever connecting means lying entirely within the area of the vertical depths of the levers; and, Still another object is the provision of a universally pivoted lever connection in which the bearings and pivots form a universal coupling.

These, and other objects and advantages will be apparent from the following description in which reference is had to the accompanying drawings, illustrating a preferred embodiment of the invention and in which similar reference numerals designate similar parts throughout the several views.

In the drawings:

Fig. I is a front elevational view of a conventional load counterbalancing mechanism which may be used in cooperation with lever mechanism embodying the invention.

Fig. II is a plan view of a lever mechanism embodying the invention.

Fig. III is an enlarged fragmentary side elevational view of the improved lever connecting means substantially as seen from along the line III—III of Fig. II.

Fig. IV is a plan view of the mechanism shown in Fig. III, the lever being broken away along the line IV—IV of Fig. III.

Fig. V is an enlarged view of the long lever nose extensions and the lever nose stirrup.

Fig. VI is an enlarged cross sectional view seen substantially from along the line VI—VI of Fig. III; and, Fig. VII is an enlarged side elevational view of the lever fulcrum viewed substantially from along the line VII—VII of Fig. II.

Referring to the drawings in detail:

Since scale pits and scale platforms are so well known in the art and since they per se form no part of this invention they are neither illustrated nor described herein.

The lever mechanism as illustrated comprises long levers 11 and 12 and short levers 13 and 14 having I beam cross sections. Each of these levers is provided adjacent one end with a pair of fulcrum pivots 15 (see Fig. VII) of hardened alloy steel and mounted in a cylindrical pivot retainer 16 extending through the body of the lever. These pivots rest in bearings 17 alignably seated in fulcrum brackets 18 which are adapted to be properly positioned in the scale pit. Load pivots 19 are similarly mounted in retainers 16 and are in spaced relation to the pivots 15. These load pivots serve to support the platform which receives the load to be weighed.

The ends of the long levers 11 and 12 are provided with adjustable nose extensions 20 and 21. An end 22 of the nose extension 20 is bifurcated and provided with a pivot 23 which rests in a bearing 24 supported by links 25 from a yoke-like member 26. Similar links 27, suspended from a superimposed yoke-like member 28, engage by means of bearings 29 nose pivots 30 which extend between furcated arms of the end of the nose extension 21 of lever 12, and a connecting rod 31 extends through aligned apertures in the yoke-like members 26 and 28 which rest upon a nut 32 threaded on the lower end of the rod 31. The upper end of this connecting rod 31 is provided with a stirrup 33 which engages a load pivot 34 in a so-called bench lever 35 fulcrumed by means of a pivot 36 on a bearing in a stirrup member 37 which is pivotally suspended from a bracket 38 secured to the underside of a shelf 39 of a cabinet or similar support 40. The opposite end of the lever 35, by means of stirrups 41 and 42 and connecting rod 43, transmits the "pull" of the load to a load pivot 44 in a load counterbalancing beam structure 45. This beam structure is fulcrumed by means of pivot 46 on a fulcrum stand 47 mounted upon a deck 48 of the cabinet 40. The structure 45 includes graduated beams 49 and 50 upon which load counterbalancing poises 51 and 52 are mounted. A trigg loop mechanism 53 is also provided to perform its usual function. It must be understood however that any load counterbalancing mechanism may be used in place of the hereinbefore described beam structure.

In spaced relation to the fulcrum pivots 15 and load pivots 19, in the levers 11 and 12, are intermediate pivots 54 (see Fig. III). These intermediate pivots extend through integral bosses 55 which project upwardly into apertures 73 in the vertical webs of the aforementioned levers. These pivots 54 support self-aligning bearings 56 which comprise a hemispherical body resting in a conical seat 57 machined in downwardly extending bosses 58 of a bridge-like member 59. A cylindrical stem 60 of the bearing 56 extends into a bore 61 in the bosses 58 and is provided with an aperture through which the body of a screw 62 freely passes for the purpose of retaining the bearing when the bridge-like member 59 is removed from its normal position on the pivot. The bearings 56 hereinbefore described are illustrated and described in Patent No. 1,470,665 to F. H. Chapman. The bridge-like member 59 has a circular face which is machined and upon which rests a similarly machined circular portion 63 of a substantially elongated stirrup supporting member 64. The two circular machined surfaces of the members 59 and 63 are free to turn relative to each other and are only prevented from disengagement by a stud 65 driven into a suitable hole in the member 59 and extending into a bore in the member 64. The ends of the elongated supporting member 64 are provided with rectangular openings 66 which are spanned by pins 67 from which stirrups 68 are suspended (Fig. VI). The lower end of these stirrups 68 are bored for pins 69 upon which bearings 70 are supported so that they may align themselves freely to the edges of the pivots 71 extending outwardly from forked ends 72 of the short levers 13 and 14.

When platform lever mechanisms are first installed great care is taken that all pivot edges of the levers are horizontally positioned and that the bearing surfaces are in proper alignment with the pivot edges. Due to conditions, however, over which there is no control, such as the settling of the pit foundation due to frost or heavy rains, it sometimes happens that the horizontal alignment of the pivots change. When the connections between the levers are relatively long no great harm is done because the angular "out of plumb" condition is negligible. When, however, the longitudinal axes of the levers are in the same plane, a slight twist in the lever axes will cause relatively heavy binding and unequal force distribution on the pivots and bearings unless they are so constructed to very readily align themselves to the changing positions.

However, in the construction herein shown and described it will be seen that a settling of one or more of the fulcrum stands 18 will permit all of the bearings of the intermediate connecting means to realign themselves automatically even though the pivots of both long and short levers are in the same plane and the connections are very short. The bearings 56, which are free to turn about a vertical axis as well as to align themselves horizontally, permit the elongated supporting member 64 to assume a new position in which the bearings 70 may freely align themselves to the edges of the pivots 71. An uneven settling of the fulcrum stands 18, on which the fulcrum pivots of the long and short levers are resting, which would shorten or increase the distance between the upper ends of these fulcrum brackets, will cause a slight relocation of the circular portions 59 and 63 about the pin 65 and thus also adjust themselves to this changed condition.

The embodiment of the invention herein shown and described is to be regarded as illustrative only, and it is to be understood that the invention is susceptible to variation, modification and change within the spirit and scope of the subjoined claims.

Having described the invention, I claim:

1. In a weighing scale, in combination with load counterbalancing mechanism, a load supporting lever system of the "A" type comprising at least one long and one short lever, each of said levers having a vertical web, there being an opening in the vertical web of said long lever, a pivot fixed in said opening and extending on each side of said web, a bridge-like member having universally mounted bearings engaging said extending portions of said pivot and a supporting member swively supported upon said bridge-like member and stirrups pivotally suspended therefrom for engagement with pivots in said short lever; said bridge-like member, said supporting member and said pivots and stirrups being all situated within the area defined by the walls of said opening in said web of said long lever.

2. In a weighing scale, in combination with load counterbalancing mechanism, a load supporting lever system comprising a pair of cooperating levers, each of said levers having a vertical web, there being an opening in the vertical web of one of said levers, a pivot fixed in said opening and extending on each side of said web, a bridge-like member having universally mounted bearings engaging said extending portions of said pivot and a supporting member swively supported upon said bridge-like member and stirrups pivotally suspended therefrom for engagement with pivots in the other of said levers; said bridge-like member, said supporting member, and said pivots and stirrups being all situated within the area defined by the walls of said opening.

3. In a weighing scale, in combination with load counterbalancing mechanism, a load supporting lever system comprising a pair of levers, one of said levers having a vertical web, there being an opening in said vertical web, a pivot fixed in said opening and extending on each side of said web, means having universally mounted bearings engaging said extending portions of said pivot, a supporting member swively supported upon said means and stirrups pivotally suspended from said means for engagement with pivots in the other of said levers, said means, said supporting member, said pivots, and said stirrups all being situated within the area defined by the walls of said opening in said web.

4. In a weighing scale, in combination with load counterbalancing mechanism, a load supporting lever system comprising a pair of levers, one of said levers having a vertical web, there being an opening in said vertical web, a pivot fixed in said opening and extending on each side of said web, means having universally mounted bearings engaging said extending portions of said pivot, a supporting member swively supported upon said means and stirrups pivotally suspended from said means for engagement with pivots in the other of said levers, said means, said supporting member, said pivots, and said stirrups all being situated within the area defined by the walls of said opening in said web, the edges of said pivots being located in a common plane.

HALVOR O. HEM.